US009842491B2

(12) United States Patent
Ariel et al.

(10) Patent No.: US 9,842,491 B2
(45) Date of Patent: Dec. 12, 2017

(54) UNIVERSAL REMOTE CONTROL

(71) Applicant: Sure Universal Ltd, Ramat Gan (IL)

(72) Inventors: Viktor Ariel, Modiin (IL); Vadim Lanzman, Petah Tikva (IL); Michael Kanzieper, Modiin (IL); Alon Buchnik, Yokneam (IL)

(73) Assignee: Sure Universal Ltd., Ramat Gan (IL)

( * ) Notice: Subject to any disclaimer, the term of this patent is extended or adjusted under 35 U.S.C. 154(b) by 0 days.

(21) Appl. No.: 14/870,353

(22) Filed: Sep. 30, 2015

(65) Prior Publication Data
US 2016/0094702 A1 Mar. 31, 2016

Related U.S. Application Data

(60) Provisional application No. 62/057,283, filed on Sep. 30, 2014, provisional application No. 62/057,287,
(Continued)

(51) Int. Cl.
*H04M 3/00* (2006.01)
*G08C 17/02* (2006.01)
(Continued)

(52) U.S. Cl.
CPC .............. *G08C 17/02* (2013.01); *A63F 13/86* (2014.09); *G06Q 30/0277* (2013.01);
(Continued)

(58) Field of Classification Search
CPC    G08C 17/02; G08C 2201/30; G08C 2201/92; G08C 2201/93; A63F 13/86;
(Continued)

(56) References Cited

U.S. PATENT DOCUMENTS 7,586,398 B2    9/2009  Huang et al.
8,519,820 B2    8/2013  Cannistraro
(Continued)

OTHER PUBLICATIONS

International Search Report for application PCT/IB2015/057500 dated Dec. 13, 2015.
(Continued)

*Primary Examiner* — Mong-Thuy Tran
(74) *Attorney, Agent, or Firm* — Heidi Brun Associates Ltd.

(57) ABSTRACT

Disclosed is a universal remote control device including a display to provide a graphical unit interface (GUI), a controller configured to process registration requests from state machines associated with remotely controllable appliances and to manage control data transfer to and from the state machines responsive to the registration requests, and a communication module to enable communications between the device and the state machines. Additionally disclosed is a graphics interface unit (GUI) implementable on a display of a computing device operable to remotely control a plurality of appliances. The GUI includes a screen area on the display to display output information, and a plurality of sections on the display to simultaneously display input selection functions associated with different levels of a hierarchical arrangement of control functions for the plurality of appliances.

2 Claims, 16 Drawing Sheets

Related U.S. Application Data filed on Sep. 30, 2014, provisional application No. 62/057,289, filed on Sep. 30, 2014.

(51) Int. Cl.
*H04M 1/725* (2006.01)
*H04W 4/00* (2009.01)
*A63F 13/86* (2014.01)
*G06Q 30/02* (2012.01)
*H04L 29/06* (2006.01)

(52) U.S. Cl.
CPC ......... *H04L 65/4069* (2013.01); *H04L 67/38* (2013.01); *H04M 1/72533* (2013.01); *H04W 4/008* (2013.01); *G08C 2201/30* (2013.01); *G08C 2201/92* (2013.01); *G08C 2201/93* (2013.01); *H04M 3/00* (2013.01)

(58) Field of Classification Search
CPC . G06Q 30/0277; H04L 65/4069; H04L 67/38; H04M 1/72533; H04W 4/008
USPC ........................................................ 455/420
See application file for complete search history.

(56) References Cited

U.S. PATENT DOCUMENTS

| | | | |
|---|---|---|---|
| 2003/0106062 A1 | 6/2003 | Shteyn et al. | |
| 2003/0234737 A1* | 12/2003 | Nelson | G08C 19/28 341/176 |
| 2004/0210933 A1* | 10/2004 | Dresti | G08C 17/00 725/40 |
| 2006/0143572 A1* | 6/2006 | Scott | H04N 5/4403 715/765 |
| 2007/0130607 A1 | 6/2007 | Thissen et al. | |
| 2009/0239587 A1* | 9/2009 | Negron | G06F 3/04883 455/566 |
| 2009/0298535 A1 | 12/2009 | Klein et al. | |
| 2010/0017736 A1* | 1/2010 | Kim | G08C 17/02 715/771 |
| 2010/0017821 A1 | 1/2010 | Leonov et al. | |
| 2010/0138764 A1* | 6/2010 | Hatambeiki | G08C 17/02 715/765 |
| 2011/0007018 A1* | 1/2011 | McKinley | G08C 17/02 345/173 |
| 2011/0093799 A1* | 4/2011 | Hatambeiki | G08C 17/02 715/763 |
| 2012/0066639 A1* | 3/2012 | Hunter | H04L 12/2812 715/784 |
| 2012/0086563 A1* | 4/2012 | Arling | G06F 3/0486 340/12.52 |
| 2012/0124245 A1* | 5/2012 | Reeves | G05B 19/0426 710/8 |
| 2012/0188113 A1 | 7/2012 | In | |
| 2012/0295662 A1 | 11/2012 | Haubrich | |
| 2013/0283325 A1 | 10/2013 | Chiniara | |
| 2014/0067094 A1* | 3/2014 | Park | G05B 15/02 700/90 |
| 2014/0067131 A1* | 3/2014 | Park | A47L 15/4293 700/275 |
| 2014/0153927 A1 | 6/2014 | Langer | |
| 2014/0222862 A1* | 8/2014 | Arling | G06F 17/30477 707/769 |
| 2014/0229889 A1* | 8/2014 | Hilbrink | G06F 3/0484 715/784 |
| 2014/0342709 A1* | 11/2014 | Stepanian | G06F 21/10 455/414.1 |
| 2015/0220075 A1* | 8/2015 | Ziv | G05B 15/02 340/12.5 |
| 2015/0301709 A1* | 10/2015 | Chambers | G06F 3/0485 715/716 |
| 2016/0075034 A1* | 3/2016 | Laurent | H04L 12/282 700/264 |

OTHER PUBLICATIONS

International Search Report for application PCT/IB2015/057506 dated Jan. 4, 2016.

\* cited by examiner

UNIVERSAL REMOTE CONTROL

CROSS-REFERENCE TO RELATED APPLICATIONS

This application claims benefit from U.S. Provisional Patent Application No. 62/057,283 filed Sep. 30, 2014, to 62/057,287 filed Sep. 30, 2014, and to 62/057,289 filed Sep. 30, 2014, all of which are hereby incorporated in their entirety by reference.

FIELD OF THE INVENTION

The present invention relates to electronic and electrical appliances generally and to a system and method of remotely controlling these appliances in particular.

BACKGROUND OF THE INVENTION

Remote control devices to allow a user to remotely control the operation of electrical and electronic appliances are well known and have been around for many decades. In the earlier days, manufacturers configured appliances to operate with a dedicated remote control device which was programmed with a particular identification code which allowed the device to pair with the appliance, generally communicating using infrared (IR) or radio frequency (RF) communications to control the device. Each appliance required its own remote control device so that a household frequently found itself with numerous remote control devices for controlling the various televisions, air conditioners, and other controllable appliances generally found in a typical home.

In order to solve the problem of dealing with multiple remote control devices, universal remote control devices were developed. These were preprogrammed with a relatively large number of identification codes which allowed the device to pair with those appliances whose identification codes were among those programmed into the device, thereby allowing control of numerous appliances. Nevertheless, these universal remote control devices were limited to controlling only those appliances whose identification codes were preprogrammed into the device, and required extensive amounts of time to locate the correct identification code for each appliance from among all those stored in the device.

With technological advancements and the increase in popularity of the Internet, universal remote control devices were developed as part of systems which could access databases through the Internet in order to download the identification codes to the devices. These databases generally stored a large number of identification codes suitable to allow the remote control devices to communicate with and control a large number of appliances of different types and from different manufacturers. An example of such a system is described in U.S. Pat. No. 7,586,398 B2 to Huang et al., which discloses "A system and method for using an RFID tag to automatically setup and configure a universal remote control to command appliances of various types and various manufacturers". Another example of such system is described in US Patent Application Publication No. 2012/0295662 A1 to Haubrich which discloses "A universal remote control system and method for employing a centralized database for programming the universal remote control (URC) to control the operation of appliance(s). The appliance(s) may or may not be made by different manufactures. The centralized database is accessible via the Internet and includes many different appliances made by many different manufacturers. The user may access a web site of the centralized database and manually enter electronic appliances identifying data that the URC is desired to operate, and then the centralized database sends the appropriate command code data to the URC either directly or temporarily downloads them into a computer to be later loaded into the URC. The centralized database includes command codes for appliances such as TV sets, DVDs, CD systems, alarm clocks, and VCRs, music synthesizers, toys, stereo systems, ovens, washing machines, timers, power strips, and the like".

More recently, with the explosive increase in the global use of smartphones and their continuously-expanding processing power, the trend is to implement universal remote control devices in the smartphones. Numerous application programs have been developed which allow a user to control electronic multi-media devices and other electronic and electrical appliances from a smartphone. U.S. Pat. No. 8,519,820 B2 to Cannistraro discloses "Systems and methods for saving and restoring scenes in a multimedia system with minimal configuration are provided. The techniques of the present invention can allow the states of the components in the multimedia system to be captured in a scene. Once the scene has been saved, the scene can be restored at a later time. A remote control system for recommending scenes by comparing states of components in the current scene with states of components in saved scenes is also provided. The remote control system can also recommend scenes based on usage patterns. Moreover, the remote control system can allow users to designate one or more saved scenes as favorite scenes".

SUMMARY OF THE PRESENT INVENTION

There is provided, in accordance with an embodiment of the present invention, a universal remote control device including a display to provide a graphical unit interface (GUI), a controller configured to process registration requests from state machines associated with remotely controllable appliances and to manage control data transfer to and from the state machines responsive to the registration requests, and a communication module to enable communications between the device and the state machines.

According to an embodiment of the present invention, the controller includes a state machine module to process the registration requests and to manage the control data transfer.

According to an embodiment of the present invention, the state machine module includes a state machine register to store message codes associated with the registration requests.

According to an embodiment of the present invention, the controller includes a selection wizard module to allow a user to manipulate the GUI.

According to an embodiment of the present invention, the controller includes a control panel hierarchy module to control a hierarchical arrangement of the GUI.

According to an embodiment of the present invention, the GUI is configured to simultaneously display several levels of the hierarchical arrangement on the display.

According to an embodiment of the present invention, the universal remote control device additionally includes a memory module to store state machine selection and control data.

According to an embodiment of the present invention, the memory module includes one or more databases to store the selection and control data according to a communication method between the device and the state machines.

According to an embodiment of the present invention, the memory module includes a database to store the selection and control data manually input by a user.

According to an embodiment of the present invention, the selection and control data is downloaded to the one or more databases from an appliance data server.

According to an embodiment of the present invention, the communication module includes an Internet connection unit to connect over the Internet with a database to download the selection and control data to the one or more databases.

According to an embodiment of the present invention, the communication module includes an Internet connection unit to connect over the Internet with a database to upload device usage information to a database.

According to an embodiment of the present invention, the communications module includes means to communicate between the device and the state machines using any one or any combination of Wi-Fi, infrared (IR), and radio frequency (RF) communications.

There is provided, in accordance with an embodiment of the present invention, a method of remotely controlling appliances, the method includes communicating between a universal remote controller and state machines associated with remotely controllable appliances, processing registration requests from the state machines on the remote controller, and managing control data transfer between the remote controller and the state machines responsive to the registration requests.

According to an embodiment of the present invention, the method additionally includes storing message codes associated with the registration requests in the remote controller.

According to an embodiment of the present invention, the method additionally includes storing selection and control data in a database in the remote controller according to a communications method between the remote controller and the state machines.

According to an embodiment of the present invention, the method additionally includes downloading the selection and control data from a database over the Internet.

According to an embodiment of the present invention, the method additionally includes storing manually input data by a user in a database in the remote controller.

According to an embodiment of the present invention, the method additionally includes uploading remote controller usage data to a database over the Internet.

According to an embodiment of the present invention, communicating includes using any one or any combination of Wi-Fi, infrared (IR), and radio frequency (RF) communications.

According to an embodiment of the present invention, the method additionally includes operating a graphical unit interface (GUI) in the remote controller to transfer the control data between the remote controller and the state machines According to an embodiment of the present invention, the method additionally includes controlling a hierarchical arrangement of the GUI.

According to an embodiment of the present invention, the method additionally includes simultaneously displaying several levels of the hierarchical arrangement on a display.

There is provided, in accordance with an embodiment of the present invention, a remote control system for remotely controlling appliances including a universal remote control device including a display to provide graphical unit interface (GUI), a controller configured to process registration requests from state machines associated with remotely controllable appliances and to manage control data transfer to and from the state machines responsive to the registration requests, and a communication module to enable communications between the device and the state machines. The remote control system additionally includes a usage data server to upload and process device usage information, and an appliance data server to download selection and control data associated with the state machines to the remote controller.

According to an embodiment of the present invention, the communication module includes an Internet connection unit to connect over the Internet with the usage data server and the appliance data server.

There is provided, in accordance with an embodiment of the present invention, a graphics interface unit (GUI) implementable on a display of a computing device operable to remotely control a plurality of appliances, the GUI includes a screen area on the display to display output information, and a plurality of sections on the display to simultaneously display input selection functions associated with different levels of a hierarchical arrangement of control functions for the plurality of appliances.

According to an embodiment of the present invention, a top level of the hierarchical arrangement is associated with different groups of any one of appliance types and appliance sets.

According to an embodiment of the present invention, a secondary level of the hierarchical arrangement is associated with different appliances within a group of appliance types or appliance sets, and wherein the secondary level is displayed on an appliance selection section of the display.

According to an embodiment of the present invention, a tertiary level of the hierarchical arrangement is associated with different functional features of an appliance, and wherein the tertiary level is displayed on a panel selection section of the display.

According to an embodiment of the present invention, a quaternary level of the hierarchical arrangement is associated with different elements of a functional feature of an appliance, and wherein the quaternary level is displayed on a control panel section of the display.

According to an embodiment of the present invention, the input selection functions include selector buttons.

According to an embodiment of the present invention, the plurality of sections includes a control panel section, a panel selector section, and an appliance selector section.

According to an embodiment of the present invention, the control panel section is located on the display below the screen area, the panel selector section is located below the control panel section, and the appliance selector section is located to the left of the control panel.

According to an embodiment of the present invention, the appliance selector section and the panel selector section include slider bars.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
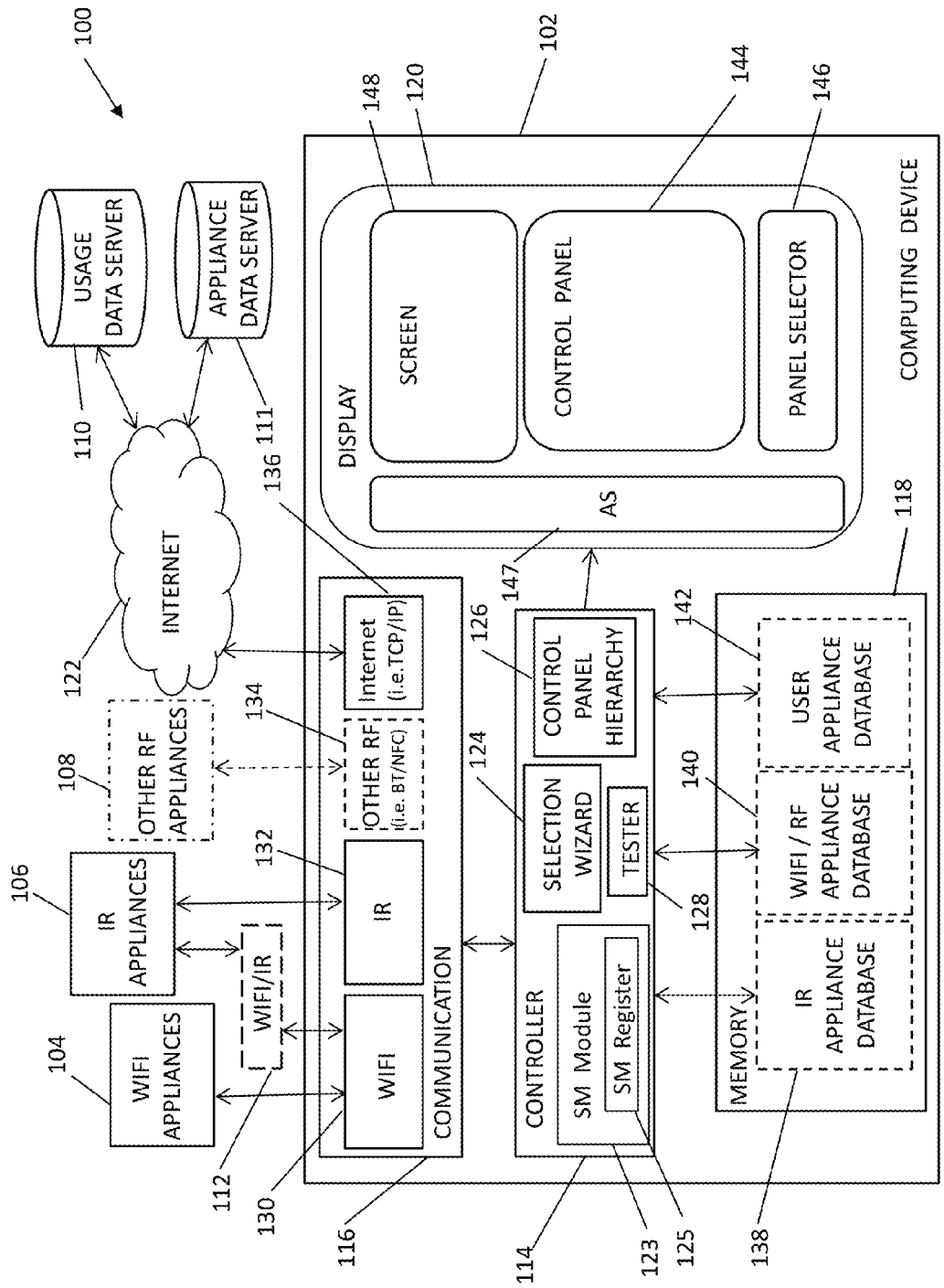
FIG. 1 schematically illustrates a universal remote control system, according to an exemplary embodiment of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE PRESENT INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Unless specifically stated otherwise, as apparent from the following discussions, it is appreciated that, throughout the specification, discussions utilizing terms such as "processing," "computing," "calculating," "determining," or the like, refer to the action and/or processes of a computer, computing system, or similar electronic computing device that manipulates and/or transforms data represented as physical, such as electronic, quantities within the computing system's registers and/or memories into other data similarly represented as physical quantities within the computing system's memories, registers or other such information storage, transmission or display devices.

Embodiments of the present invention may include apparatus for performing the operations herein. This apparatus may be specially constructed for the desired purposes, or it may comprise a general-purpose computer selectively activated or reconfigured by a computer program stored in the computer. Such a computer program may be stored in a computer readable storage medium, such as, but not limited to, any type of disk, including floppy disks, optical disks, magnetic-optical disks, read-only memories (ROMs), compact disc read-only memories (CD-ROMs), random access memories (RAMs), electrically programmable read-only memories (EPROMs), electrically erasable and programmable read only memories (EEPROMs), magnetic or optical cards, Flash memory, or any other type of media suitable for storing electronic instructions and capable of being coupled to a computer system bus.

The processes and displays presented herein are not inherently related to any particular computer or other apparatus. Various general-purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the invention as described herein.

Applicants have realized that one of the major drawbacks with known universal remote control devices is that they generally require configuring the device and the appliance to be controlled, to make them compatible for most, if not all, modes of operation. This compatibility issue generally applies both to the older handheld dedicated universal remote control devices as well as to the newer, Internet-connectable mobile devices, including smartphones (the Internet-connectable mobile devices may also be referred to hereinafter as "remote control device", "universal remote control device" or "device"). This typically requires that a user search for the identification code of each appliance which is to be controlled, and may additionally require that the user configure a set of parameters in each appliance and/or in the remote control device to pair the devices for each mode of operation. Performing these tasks may require that the user have some technical understanding of each appliance's operation, and frequently may result in user failure to successfully configure the remote control device and/or the appliance with the correct parameters. Not only may this be very frustrating for the user, but many times, the user may be faced with little choice but to call a technician to come to perform the configuring (which may be expensive and time consuming).

Applicants have further realized that a universal remote control system which is based on using an event-driven architecture substantially overcomes the previously described drawback of requiring the user (or somebody on his behalf) to configure the remote control device and/or the appliances. Therefore, disclosed herein is a universal remote control system based on an event-driven architecture (EDA) which may individually and/or collectively control different types of electronic and electrical appliances. In the EDA, each application in an appliance is associated with a state machine configured to send messages to, and receive messages from, other state machines. The state machines may also be configured to monitor message transmissions between other state machines. The EDA may include an event and message handler (hereinafter referred to as "switch") which may act as a message broker to automatically handle the transfer of messages between state machines, and a conflict manager to automatically resolve conflicts in transmitted messages between state machines.

The state machines may all be associated with a particular appliance, or with several appliances whose operation may be interrelated. Consequently, it may be appreciated, the remote control system may allow use of a single remote controller to individually control different types of appliances, and may additionally allow jointly controlling different appliance and types of appliances as a single appliance set.

Reference is now made to FIG. 1 which schematically illustrates a universal remote control system 100, according to an exemplary embodiment of the present invention. Remote control system 100 may be EDA-based and may include one or more computing devices, for example, computing device 102; any combination of electrical and electronic appliances which may include WIFI appliances 104, IR appliances 106, and optional RF appliances 108; an optional WIFI/IR converter 112; a usage data server 110 and an appliance data server 111. WIFI appliances 104 may be any one or more electronic or electric appliances which may be remotely controlled using WIFI communications, and may include, for example, smart TVs and other multi-media devices, stereos, DVDs, set top boxes, coffee machines, washing and drying machines, refrigerators, ovens including microwave ovens, light switches, security systems, window shutters, garage doors, among many other appliances which may be remotely controlled using WIFI communications. IR appliances 106 may be any one or more types of electronic and electrical appliance which may be remotely controlled using IR communications, and may include all appliances known in the art as "legacy" appliances. RF appliances 108 may be any one or more types of electronic and electrical appliance which may be remotely controlled using RF communications, which may include Bluetooth (BT) communications, Near Field communication (NFC), RFID (radio frequency identification), among other types of RF communication technologies suitable for remotely controlling electrical and electronic appliances.

Computing device 102 may include a controller module 114, a communication module 116, a memory storage module 118, and a display 120. Computing device 102 may serve as a universal remote control device and may preferably be, although not limited to, a handheld computing device and may include, for example, a smartphone, a tablet, or a dedicated Internet-connectable handheld remote control device. Computing device 102 may discover and pair with any one or more of WIFI appliances 104, IR appliances 106, and optional RF appliances 108, to remotely control their operation.

Computing device 102 may additionally be configured to download content from the Internet 122 and to stream the content to any of the paired appliances suitably configured to receive streaming content. Additionally or alternatively, the content may be stored in computing device 102 and may be streamed to any of the suitably configured appliances as desired by a user of the computing device.

Computing device 102 may connect through the Internet 122 to appliance data server 111 to download identification codes for WIFI appliances 104, IR appliances 106, and RF appliances 108, which may be stored in a database in the server. Computing device 102 may additionally download from appliance data server 111 data which may be used for the operation of the computing device as a universal remote control device and for use in the operation of universal remote control system 100, including data associated with the operation of the EDA, and which may include, aside from the information codes for the different types of appliances, data associated with the application programs of the appliances and with the operation of the switch and the conflict manager, including update information. Additionally or alternatively to connecting to appliance data server 111 through the Internet 122, computing device may connect to the server through other connection means well known in the art for server/user data transfer.

Computing device 102 may upload data through the Internet 122 to usage data server 110 which may be associated with identification data associated with the computing device itself or with a user of the computing device. The uploaded data may additionally include information which may be processed by usage data server 110 to determine computing device 102 usage characteristics, for example, frequency of usage or hours of usage of the different types of appliances included in WIFI appliances 104, IR appliance 106, and RF appliances 108, among many other types of data which may be uploaded and may be associated with computing device 102 usage characteristics. Additional data which may be uploaded to usage data server 110 may include data input by a user or automatically generated by the device such as, for example, new identification codes for remotely controlled appliances, results of conflict management functions as described further on herein, among all types of different data which may be uploaded from the computing device 102 to enhance system 100 operation.

It may be appreciated by the skilled person that the functions performed by usage data server 110 and appliance data server 111, although described herein as two separate servers, may be functionally performed by one server which may integrate the functions performed by both servers. It may be further appreciated, that the distribution of functions as described above are not intended to be limiting, and that some of the functions described as being performed by one server may be performed by the other server, and vice versa. It may be additionally appreciated that usage data server 110 and appliance data server 111 may communicate with one another over the Internet 122, or through other means known in the art, to exchange data between them, including data which may be processed by one server and stored in the other server.

Communication module 116 may include a WIFI connection unit 130 to allow communication between computing device 102 and WIFI appliances 104. WIFI connection unit 130 may optionally communicate with WIFI/IR converter 112 to enable WIFI communication between computing device 102 and IR appliances 106 fitted with the WIFI/IR converter. Communication module 116 may additionally include an IR connection unit 132 to allow communication between computing device 102 and IR appliances 106. Communication module 116 may additionally include a RF connection unit 134 to allow communication between computing device 102 and RF appliances 108. Communication module 116 may additionally include an Internet connection unit 136 to allow Internet connections between computing device 102 over the Internet 122, including with usage data server 110 and appliance data server 111.

Controller module 114 may include a state machine module 123, a selection wizard module 124, a control panel hierarchy module 126, and a tester module 128. State machine module 123 may serve as the core of the EDA architecture and may monitor the state of the state machines associated with each appliance and may additionally trigger changes in the states. The changes in the states may be triggered responsive to user initiated operations or responsive to the monitoring, and may include use of a switch and a conflict manager, as will be described further on below in greater detail with reference to FIGS. 2A-6B. State machine module 123 may include a state machine register 125 to temporarily store data associated with the state of each state machine, including message codes as also described further on below.

Selection wizard module 124 may serve to guide a user operating computing device 102 to facilitate automatic discovery and pairing with WIFI appliances 104, IR appliances 106, RF appliances 108, and to facilitate automatic downloading and uploading of data to and from usage data server 110 and appliance data server 111. It may also guide a user to facilitate controlling the various appliances. Selection wizard module 124 may interface with memory 118 to store data into, and access data from, an optional IR appliance database 138, an optional WIFI/RF appliance database 140, and an optional USER appliance database 142, which may be included in the memory. Associated with selection wizard module 124 may be tester module 128 which may serve to test the user's selection of control buttons for new appliances and may provide the user with performance feedback to allow the user to potentially select the most suitable control buttons.

Control panel hierarchy module 126 may control the arrangement of a display 120 as a graphical user interface (GUI) to allow hierarchical navigation through the various input and output panels displayed on the display. Display panel 120 may include four general areas where the input and output panels of the GUI may be hierarchically displayed, a control panel 144, a screen 148, an appliance selector 147, and a panel selector 146. Appliance selector 147 may include a slider bar with selector buttons to allow selection of an appliance from different appliances which may be controlled and are associated with a selected appliance type. Panel selector 146 may include a slider bar with selector buttons to allow selection of a panel from a number of different panels which may be used for control and are associated with a selected appliance. Control panel 144 may include selector buttons to allow selection of a feature (element) from the different features which may be controllable in an appliance and are associated with a selected panel. Screen 148 may serve for information display responsive to selections made for appliance control, but may display other type of information, which may include advertising and user information. A more detailed description of the GUI is provided further on below with reference to FIGS. 7-14. IR appliance database 138 and WIFI/RF appliance database 140 may include discovery and pairing data downloaded to computing device 102 from appliance data server 111. User appliance database 142 may include data input by the user and which may be associated with manually activated discovery and pairing functions which may be initiated by the user, and may include discovery and pairing data manually input by the user.

Figure 2:
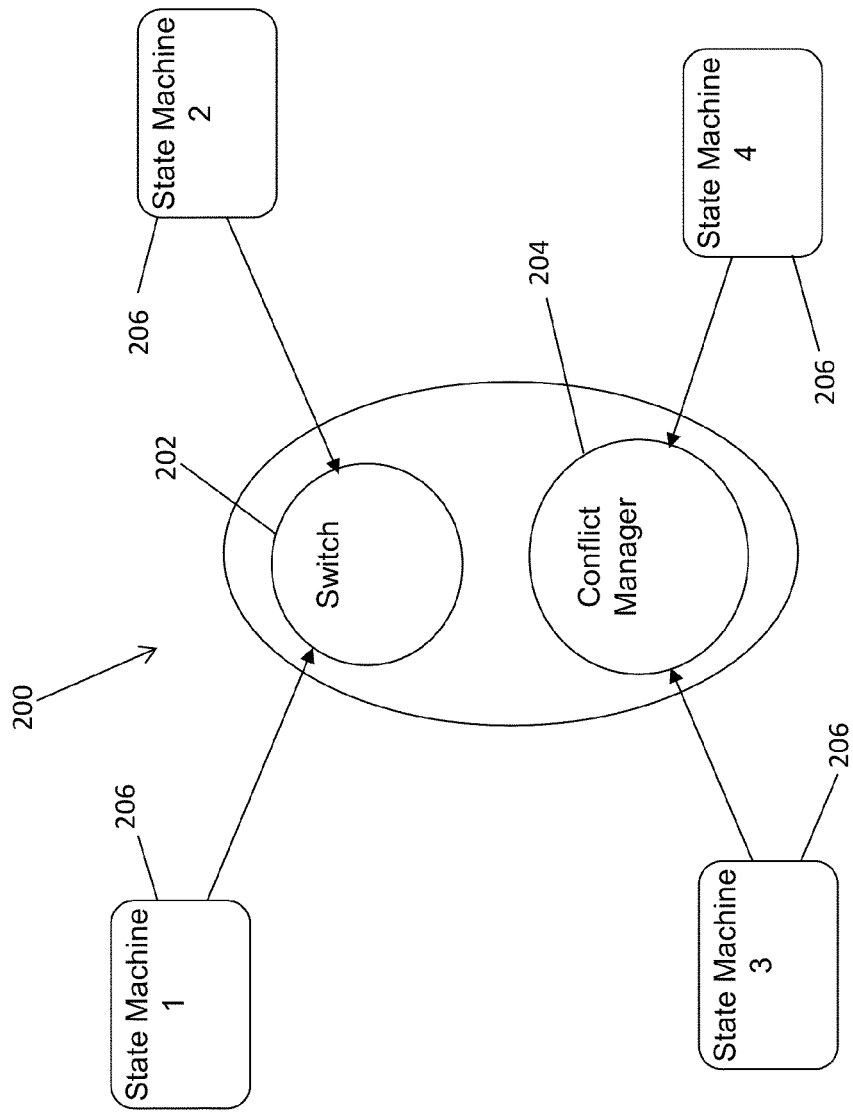
FIG. 2 schematically illustrates a functional diagram of an exemplary event-driven architecture (EDA) for use in the universal remote control system, according to an embodiment of the present invention.

Reference is now made to FIG. 2 which schematically illustrates a functional diagram of an exemplary EDA 200 for use in universal remote control system 100, according to an embodiment of the present invention. EDA 200 may include a switch 202 (message broker) and a conflict manager 204 which may be implemented in computing device 100 described in FIG. 1, for example, in state machine module 123. EDA 200 may additionally include one or more state machines 206, for example state machines 1-4 as shown although many more state machines may be included.

Each state machine 206 may represent a logical unit which may be used to process a set of scenarios based on a set of autonomic states (i.e. an event handler) associated with each appliance, and may be capable of receiving messages from other state machines and sending messages to other state machines. The messages may include a message code associated with each state machine which may be used for identification purposes and which may be used for discovery and pairing state machines with one another.

Communications between state machines 206 may be through switch 202 which may act as a message broker. Conflict manager 204 may serve to interrupt messages sent from switch 202 to targeted state machines and may process the "interrupted" message and decide whether or not to block the message, to send as is, or to create and send another message instead.

In EDA 200, each state machine 206 may support a logical unit which may be created to handle message logics and to optionally transmit messages to other state machines via switch 202. Generally, each state machine 206 may register itself in switch 202 by registering relevant message codes it may be interested in receiving from the switch (stored in state machine register 125), and may then implement an event handler for each message code which is registered when a message arrives from the switch. Similarly, each state machine 206 may register itself in conflict manager 204 to monitor and report any messages with message codes which may be of conflict (stored in state machine register 125).

Figure 3A:
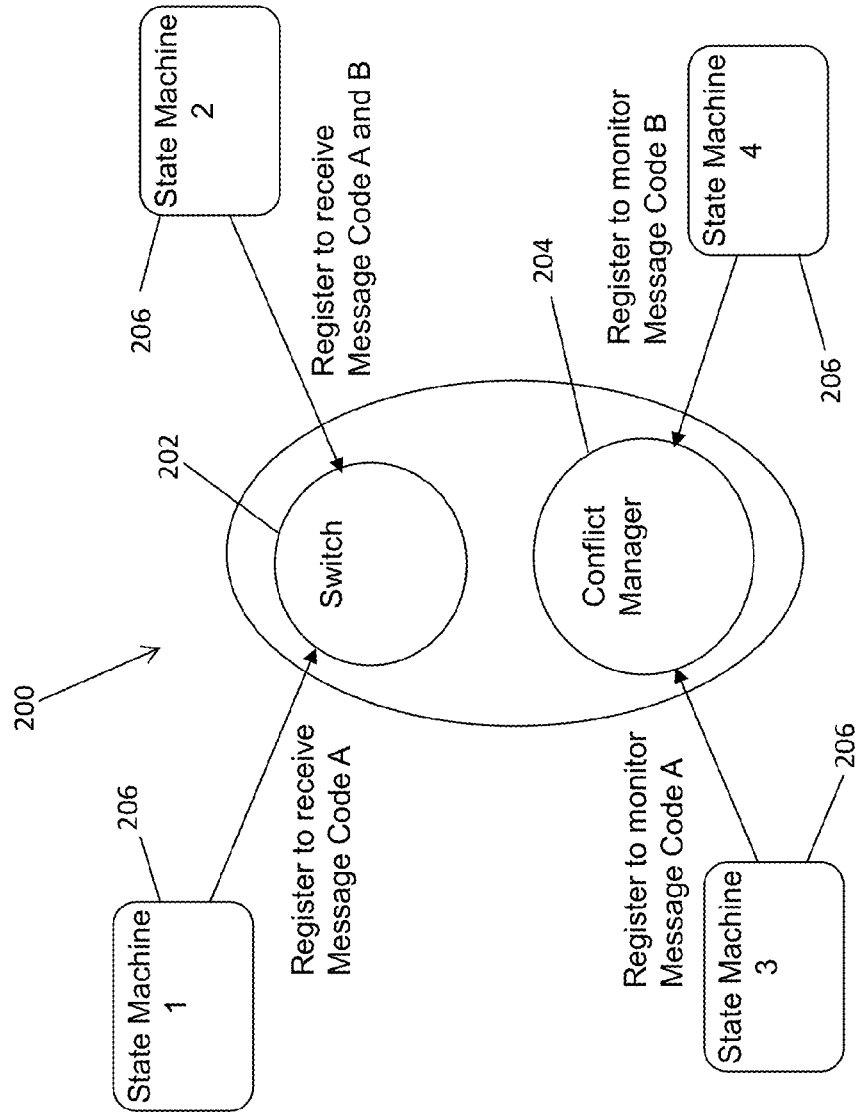
FIG. 3A schematically illustrates a functional diagram of the EDA with state machines registered to a switch and a conflict manager, according to an embodiment of the present invention.

Reference is made to FIG. 3A which schematically illustrates a functional diagram of EDA 200 with state machines 206 registered to switch 202 and conflict manager 204, according to an embodiment of the present invention. As may be appreciated from the figure, for exemplary purposes, state machine 1 is registered with switch 202 to receive messages with message code A while state machine 2 is registered with the switch to receive messages with message code A and/or with message code B. The registration of each state machine 206 associated with each particular code may be stored in switch 202 in a message code database 208 (see FIG. 4) in state machine register 125. Message code database 208 may include a registration list 210 wherein may be listed, for each message code, the state machines which have registered to receive messages with that particular message code (see FIG. 4). For example, message code database 208 may include a registration list 210 for message code A which may include state machine 1 and state machine 2, and may include a second registration list 210 for message code B which may include only state machine 2.

State machines 3 and 4 are registered with conflict manager 204 to monitor message with message codes A and B, respectively. Similarly to switch 202, registration of each state machine 206 associated with each particular code may be stored in conflict manager 204 in a message code database 216 (see FIG. 5) also in state machine register 125. Message code database 216 may include a registration list 218 wherein may be listed, for each message code, the state machines which have registered for monitoring messages with that particular message code (see FIG. 5). For example, message code database 216 may include a registration list 218 for message code A which may include state machine 3, and may include a second registration list 218 for message code B which may include only state machine 4.

Figure 3B:
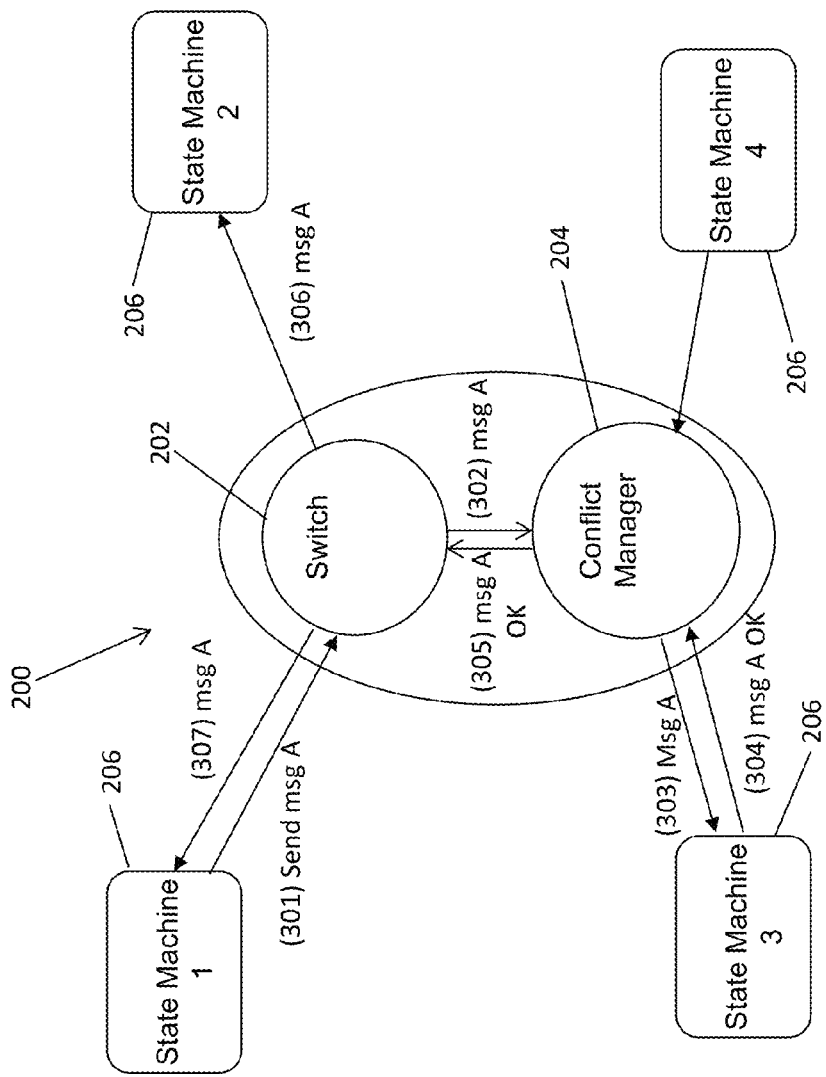
FIG. 3B schematically illustrates a process diagram of the EDA based on the state machine registrations depicted in FIG. 3A, according to an exemplary embodiment of the present invention.

Reference is now also made to FIG. 3B which schematically illustrates a process diagram of EDA 200 based on the state machine registrations depicted in FIG. 3A, according to an exemplary embodiment of the present invention. It may be appreciated by the skilled person that the steps shown for the exemplary process are not intended to be limiting and that the process may be practiced with more or less steps, or with a different sequence of steps, or any combination thereof.

At 301, state machine 1 may send a message with a message code A to switch 202;

At 302, switch 202 may transfer the message to conflict manager 204 for conflict checking (to determine whether or not there is conflict);

At 303, conflict manager 204 may transfer the message to state machine 3 who is registered with the conflict manager to monitor messages with message code A. Based on the response received from state machine 3, conflict manager 204 may prevent switch 202 from transferring the message, may alter the message prior to transferring by the switch, or may instruct the switch to transfer the message as is;

At 304, state machine 3 may return an OK message to conflict manager 204 indicative that there is no conflict;

At 305, conflict manager 204 may instruct the switch 202 to send the message as is. Alternatively, should state machine 3 return an indication of conflict, conflict manager 204 may alter the message and send the altered message to switch 202 for transfer to the target state machines, or may cancel sending the received message completely;

At 306, switch 202 may transfer the message with message code A to state machine 2 which is registered with the switch to receive message code A; and At 307, switch 202 may transfer the message with message code A to state machine 1 which is also registered with the switch to receive message code A.

Figure 4:
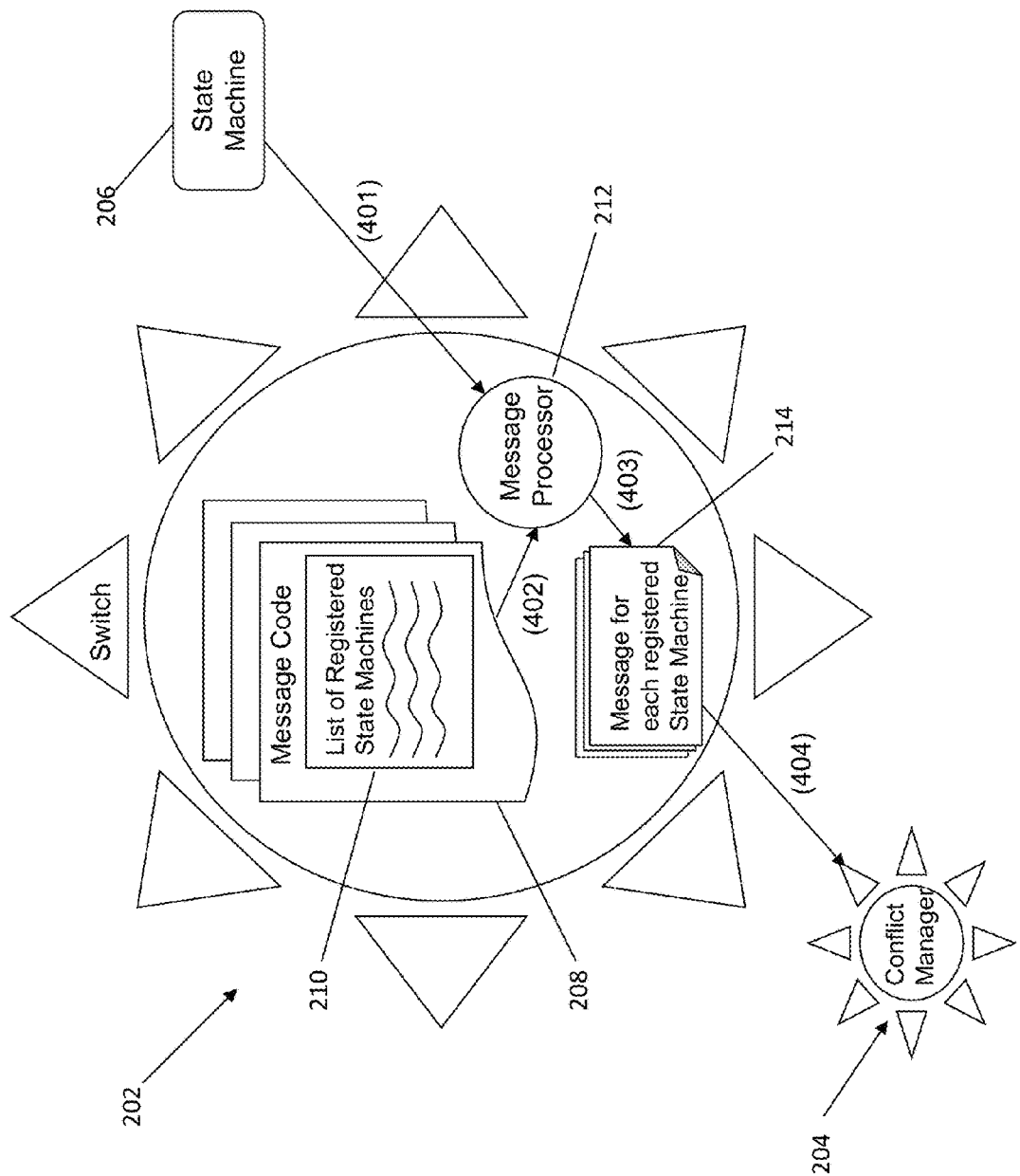
FIG. 4 schematically illustrates a functional process diagram of data flow in the switch, according to an exemplary embodiment of the present invention.

Reference is now made to FIG. 4 which schematically illustrates a functional process diagram of data flow in switch 202, according to an exemplary embodiment of the present invention. It may be appreciated by the skilled person that the steps shown for the exemplary process are not intended to be limiting and that the process may be practiced with more or less steps, or with a different sequence of steps, or any combination thereof.

At 401, state machine 206 may send a message to switch 202;

At 402, a message processor 212 in switch 202 may check in message code data base 208 for all state machines registered in registration list 210 to receive a message with the message code of the message received from state machine 206;

At 403, message processor 212 may generate one or more messages 214 responsive to the received message for sending to all state machines listed in the associated registration list 210; and At 404, message processor 212 may send message 214 to conflict manager 204 for conflict checking.

Figure 5:
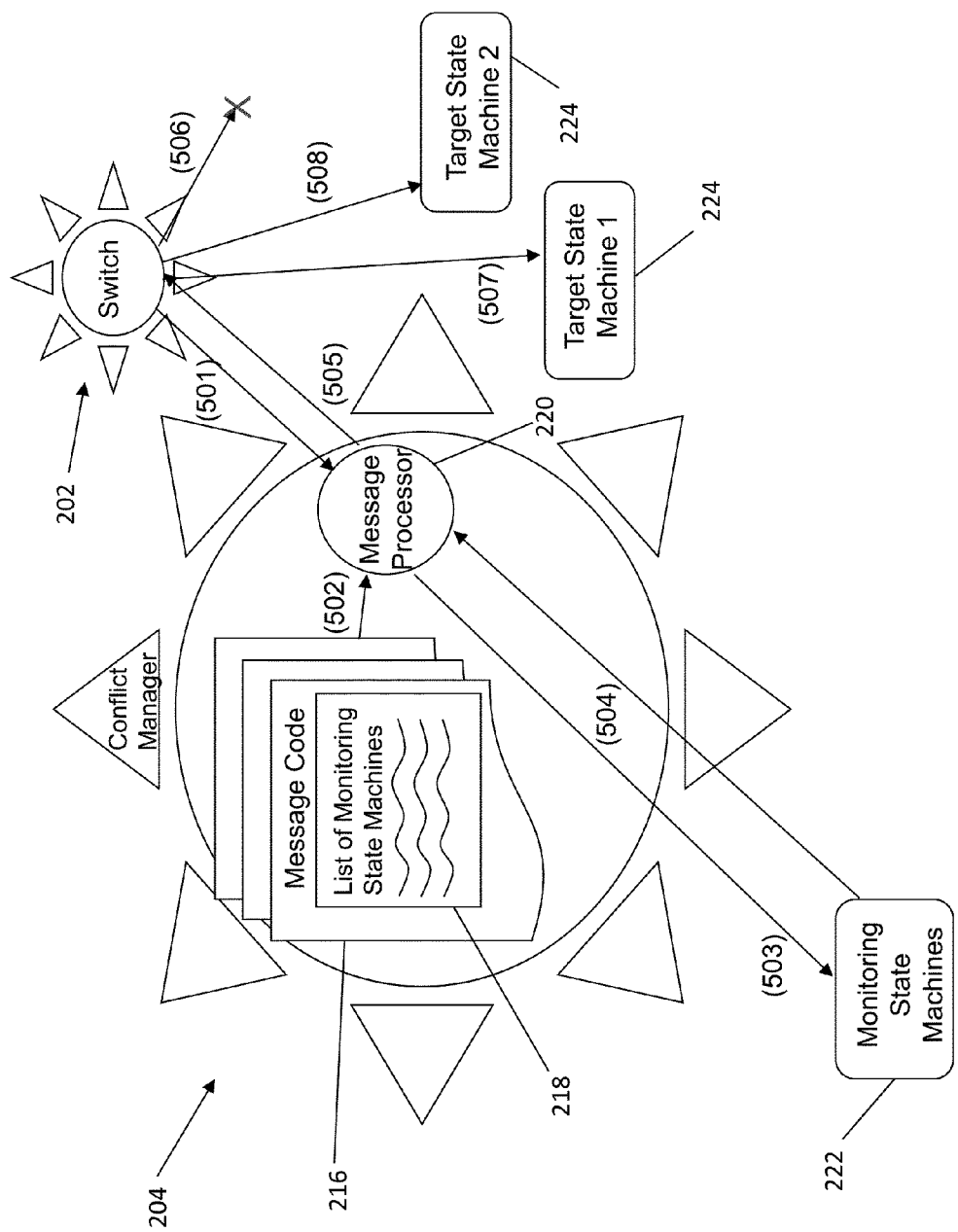
FIG. 5 schematically illustrates a functional process diagram of data flow in the conflict manager, according to an exemplary embodiment of the present invention.

Reference is now made to FIG. 5 which schematically illustrates a functional process diagram of data flow in conflict manager 204, according to an exemplary embodiment of the present invention. It may be appreciated by the skilled person that the steps shown for the exemplary process are not intended to be limiting and that the process may be practiced with more or less steps, or with a different sequence of steps, or any combination thereof.

At 501, conflict manager 204 may receive a message from switch 202;

At 502, a message processor 220 in conflict manager 204 may check in message code data base 216 for all state machines registered in registration list 218 to monitor messages with the message code of the received message from switch 202. In some embodiments, message processor 220 may be functionally replaced by message processor 212 in switch 202 so that message processor 212 also may access message code database 216;

At 503, message processor 220 may send the message to be checked to all monitoring state machines 222 listed in registration list 218 for the particular message code. The message may be sent to state machines 222 either asynchronously or alternatively, synchronously;

At 504, monitoring state machines 222 may send the results of the conflict monitoring check to message processor 220 for processing by the message processor;

At 505, message processor 220 may send instructions to switch 202 which may include terminating the message (at 506), sending an alternative message to one or more target state machines 224 (at 507 to target state machine 1), or sending the originally received message to the target state machines (at 508 to target state machine 2);

At 507, the modified message may be sent through switch 202 to target state machine 1; and At 508, the original message may be sent through switch 202 to target state machine 2.

Figure 6A:
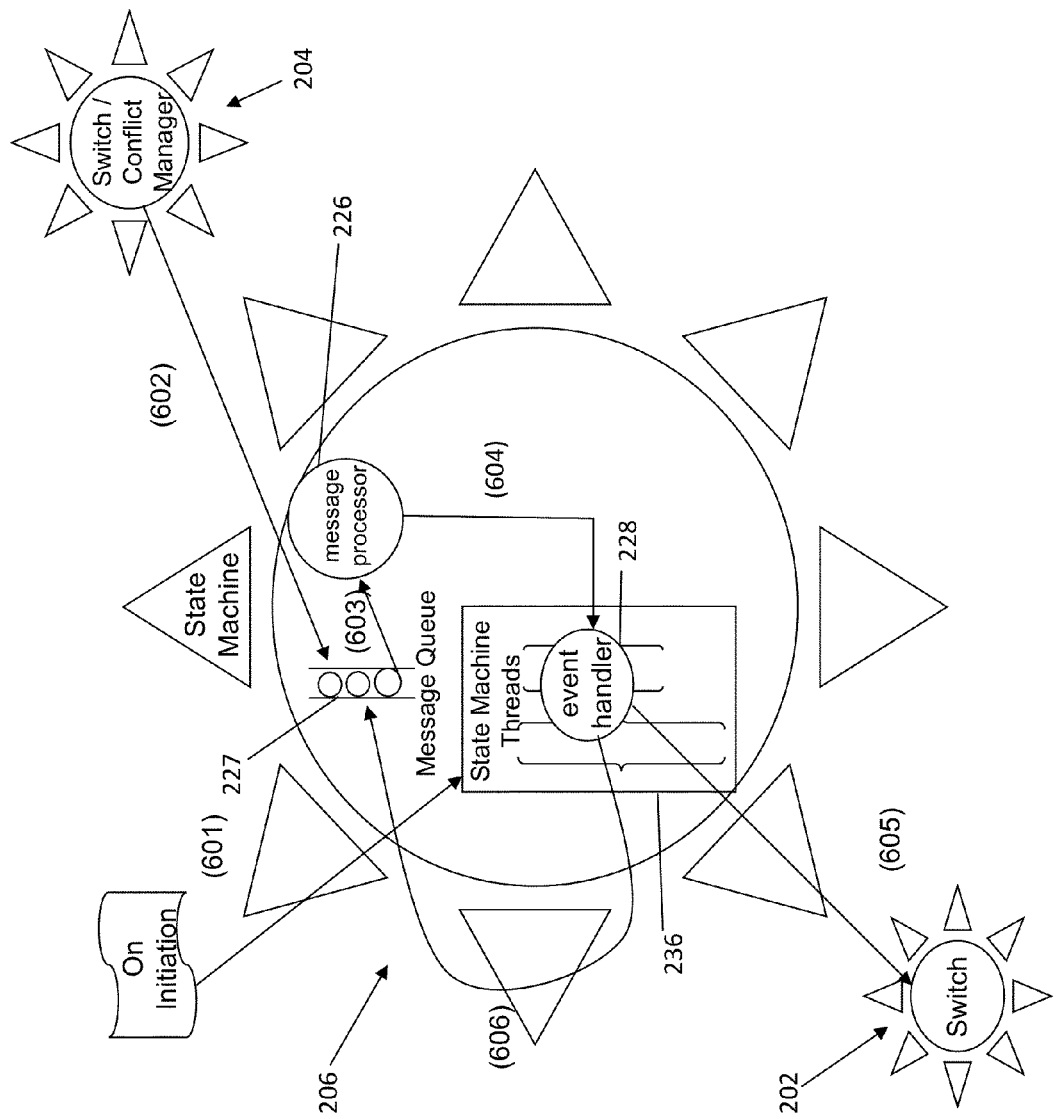
FIG. 6A schematically illustrates a functional process diagram of data flow in the state machines, according to an exemplary embodiment of the present invention.

Reference is now made to FIG. 6A which schematically illustrates a functional process diagram of data flow in state machines 206, according to an exemplary embodiment of the present invention. It may be appreciated by the skilled person that the steps shown for the exemplary process are not intended to be limiting and that the process may be practiced with more or less steps, or with a different sequence of steps, or any combination thereof.

At 601, on initiation, state machine 206 may create a group of processing threads (state machine threads) 236 which may be handled by event handlers. The threads may include synchronous and/or asynchronous threads;

At 602, state machine 206 may receive a message with a message code from switch 202 or from conflict manager 204 if the message is for conflict check, into a message queue 227;

At 603, a message processor 226 in state machine 206 may receive a notification from message que 227, and may change the state of the state machine responsive to the message code in the received message. The message may be prepared by message processor 226 for processing in a synchronous or asynchronous thread;

At 604, message processor 226 may transfer the received message for execution by an event handler 228, which may include synchronous and/or asynchronous event handlers.

Figure 6B:
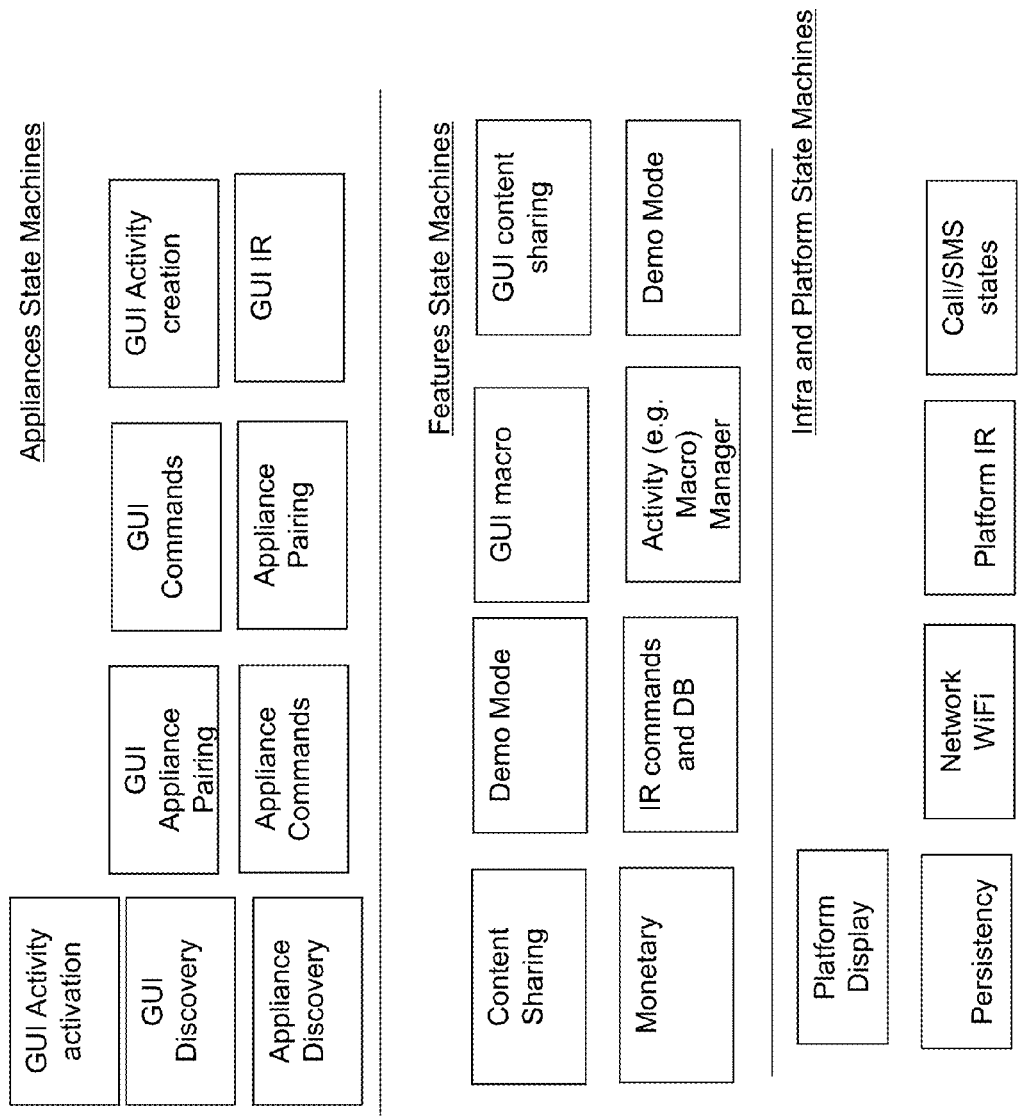
FIG. 6B is a block diagram showing exemplary state machines which may be used in the universal remote control system, according to an exemplary embodiment of the present invention.

At 605, event handler 228 may submit a new message to switch 202 or alternatively;

At 606, event handler 22 may submit a message internally in state machine 206 by pushing the message to message queue 227;

Examples of state machines which may be used in EDA 200 may include a GUI General State Machine, an Appliance State Machine including an Appliance GUI State Machine, a Platform State Machine and an Infra State Machine including an Infra GUI State Machine, and a Feature State Machine including a Feature GUI State Machine. FIG. 6B is a block diagram showing exemplary state machines which may be used in universal remote control system 100, a description of each major type provided herein below, according to an exemplary embodiment of the present invention.

a. GUI General State machine: this state machine may be used to load the first activity and to manage the behavior of activities which are not related to any specific feature. As an example, this state machine may implement an activity including an appliance's manufacturer's logo such as may appear in a first screen displayed at the start of an execution of an application on screen 148.

b. Appliance State machines: these state machines may manage the background tasks which may be relevant to a specific Appliance Type or to a specific Appliance Element, and may be subject oriented with specific Appliance types potentially implementing some state machines. Examples of some background tasks may include discovery functions, pairing functions, control commands, among others.

c. Appliance GUI State machines: these state machines may manage the GUI to allow the user to operate the Appliances. The Appliance GUI State machines may optionally be implemented in the Appliance State machines. Examples of some types of operations which may be carried out are pairing, control commands, and activation commands, among others.

d. Platform State machine: this state machine may manage the computing device's functionality. An example may include the detection of the existence of IR or of WIFI availability, among others.

e. Infra State machines: these state machines may be used by other state machines as utility or tools. An example of an Infra State Machine may be a Persistency State Machine which is a state machine which may be used by all state machines to store and retrieve persistent information.

f. Infra GUI State machines: these state machines may be used by other state machines (i.e. background state machines) but may include a GUI User Interface. An example of such a state machine may be a Settings GUI State Machine which may be used by all state machines to configure the system. Each state machine which registers to the Settings State Machine may have a section in the settings layout allowing it to be configured.

g. Feature State machine: this state machine may implement a specific feature that may be used in more than one Appliance. For example, a monetary state machine may be used as a controller over the other state machines to monitor whether a specific functionality is authorized from a monetary perspective. Another example may be an IR state machine which may be used as an IR controller to send IR commands to an Appliance.

h. Feature GUI State machines: these state machines may be used by other state machines (i.e. background state machines) but may include a GUI User Interface, and may be included in their background state machines. For example, a Monetary GUI State Machine may be used to interface the user to enable operating the monetary aspects of an application.

Applicants have realized that GUIs used in computing devices used to remotely control appliances are generally limited in their functionality. The GUI is typically designed to control a specific appliance or a specific type of appliance, for example TVs, and therefore many different GUIs may be required to control different appliances or types of appliances. As a result, a user wishing to control a number of different appliances or types of appliances may find him or herself working with a number of different GUIs on his or her computing device. As may be clearly appreciated, this may tend to be very cumbersome and confusing. Some attempts have been made to solve the above problem using a single GUI with control functions hierarchically arranged, but these require that the user continuously move back and forth between screens in order to access all the control buttons, again making the remote controller cumbersome and confusing. Furthermore, these remote controllers are generally suitable for controlling a single type of appliance (e.g. TV), and not for different types of appliances.

Applicants have realized that the flexibility provided by combining the use of selection wizard module 124 and control panel hierarchy module 126 in an EDA of the present invention may provide for a GUI which may allow controlling different appliances and different types of appliances with the same GUI. Furthermore, the same GUI may be used with most, if not all, the computing devices configurable with the selection wizard module and control panel hierarchy module and suitable to operate using the EDA of the present invention.

Figure 7:
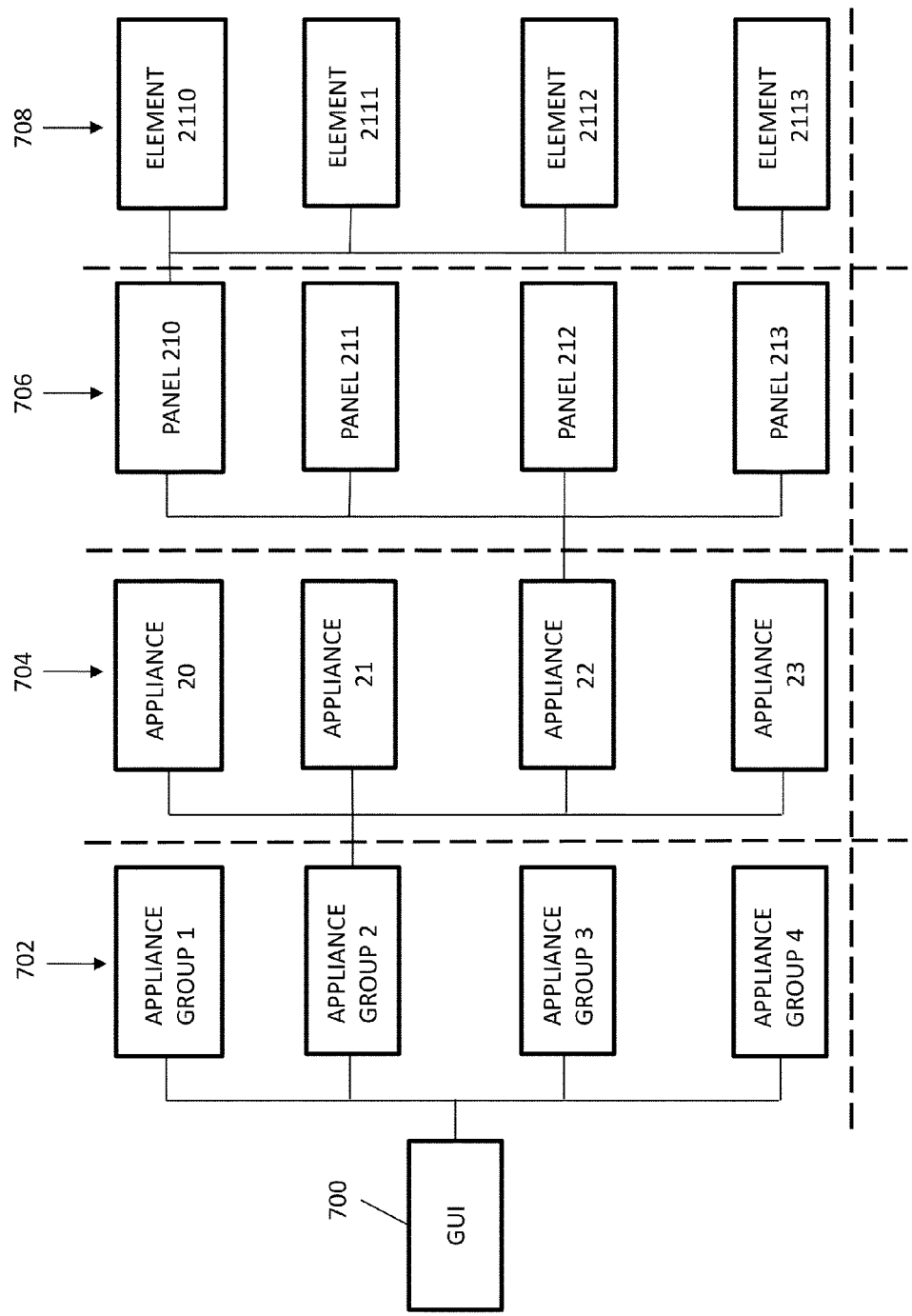
FIG. 7 schematically illustrates an exemplary functional layout of a GUI suitable for use with the computing device, according to an embodiment of the present invention.

Reference is made to FIG. 7 which schematically illustrates an exemplary functional layout of a GUI 700 suitable for use with computing device 100, according to an embodiment of the present invention. As may be appreciated from the figure, the layout may be hierarchically arranged, for example, into four hierarchical levels as shown with APPLIANCE GROUPS 1-4 on a first level, APPLIANCE 20-23 on a second level, PANEL 210-213 on a third level, and ELEMENT 2110-2113 on a fourth level.

GUI 700 may be divided in display 120 into sections to allow selector buttons associated with control functions corresponding to one or more hierarchical levels to be simultaneously displayed on display 120, allowing a user to access the control functions at all levels without having to move back and forth between screens or menus as is typically done in the art with hierarchically-arranged GUIs. For example, appliance type selector buttons 702 may be allocated a portion of display 120 to allow selection of an appliance type from different types of appliances or to allow selection of an appliance set from a group of different appliances (APPLIANCE GROUP 1-4). Appliance selector buttons 704 may be allocated another portion of the display to allow selection of an appliance from different appliances (APPLIANCE 20-23) which may be controlled and are associated with a selected appliance type. Panel selector buttons 706 may be allocated another portion of the display to allow selection of a panel from the different panels (PANEL 210-213) which may be controlled and are associated with a selected appliance. Element selector buttons 708 may be allocated another portion of the display to allow selection of an element from the different elements (ELEMENT 2110-2113) which may be controlled and are associated with a selected panel.

In an exemplary mode of operation and referring to FIG. 7, a user wishing to control an appliance may refer to selector buttons 702 and may select APPLIANCE GROUP 2 (e.g. air conditioners) as the type of appliance to be controlled. Upon selecting APPLIANCE GROUP 2, selector buttons 704 may be displayed identifying all air conditioners which may be controlled. Upon the user selecting APPLIANCE 21 (e.g. Whirlpool air conditioner model XXX) as the appliance to be controlled, selector buttons 706 may be displayed identifying all panels associated with the different controllable functions of APPLIANCE 21. These may include, for example, a panel for programming cooling functions in the air conditioner, a panel for programming heating functions, a panel for room activation, among many different panels. Upon the user selecting PANEL 210, selector buttons 708 may be displayed identifying the elements associated with the selected panel, ELEMENT 2110-2113. The user may then select the desired element or elements, for example, for setting room cooling temperature, on/off hours, rooms to be cooled, etc.

It may be appreciated, as previously described, that GUI 700 may also be used to allow a user to control appliance sets and not only appliances. GUI 700 may allow the user to build appliance sets (which may be based on instructions generated by selection wizard module 124) which may be included as an APPLIANCE GROUP, for example, APPLIANCE GROUP 3. The appliance set may include, for example, a cinema set, which may integrate joint control of a stereo system, a television, room illumination, and room temperature.

As may be appreciated from the above description, GUI 700 allows a user of computing device 100 to essentially control any appliance of any type or any appliance set, once paired with the appliance or appliances, without having to move through a number of screens and menus. It may be further appreciated that GUI 700 may be used to control discovery and pairing of computing device 100 with appliances and appliance sets whose codes and other discovery and pairing data have been downloaded from appliance data server 111, or which have been manually input by the user. It may be further appreciated that GUI 700 may allow a user to add and/or to edit any one of the levels by adding and/or removing selector buttons which may be associated with any one of the appliance types or appliance sets, appliances, panels, and elements.

It may be appreciated that GUI 700 may not be limited to including the selector buttons previously described and that it may include many other types of selector buttons which may functionally support the operation of computing device 100 as a universal remote controller. For example, some of these selector buttons may include communication selector buttons to select Wi-Fi communications, IR communications, and other RF communications (e.g. Bluetooth). Other types of selector buttons in GUI 700 may include ON/OFF selector buttons, Return Home selector buttons, Settings buttons, among many other selector buttons whose functionality are known in the art and which the skilled person may readily appreciate may contribute to the functionality of the computing device as a remote control device.

Figure 8:
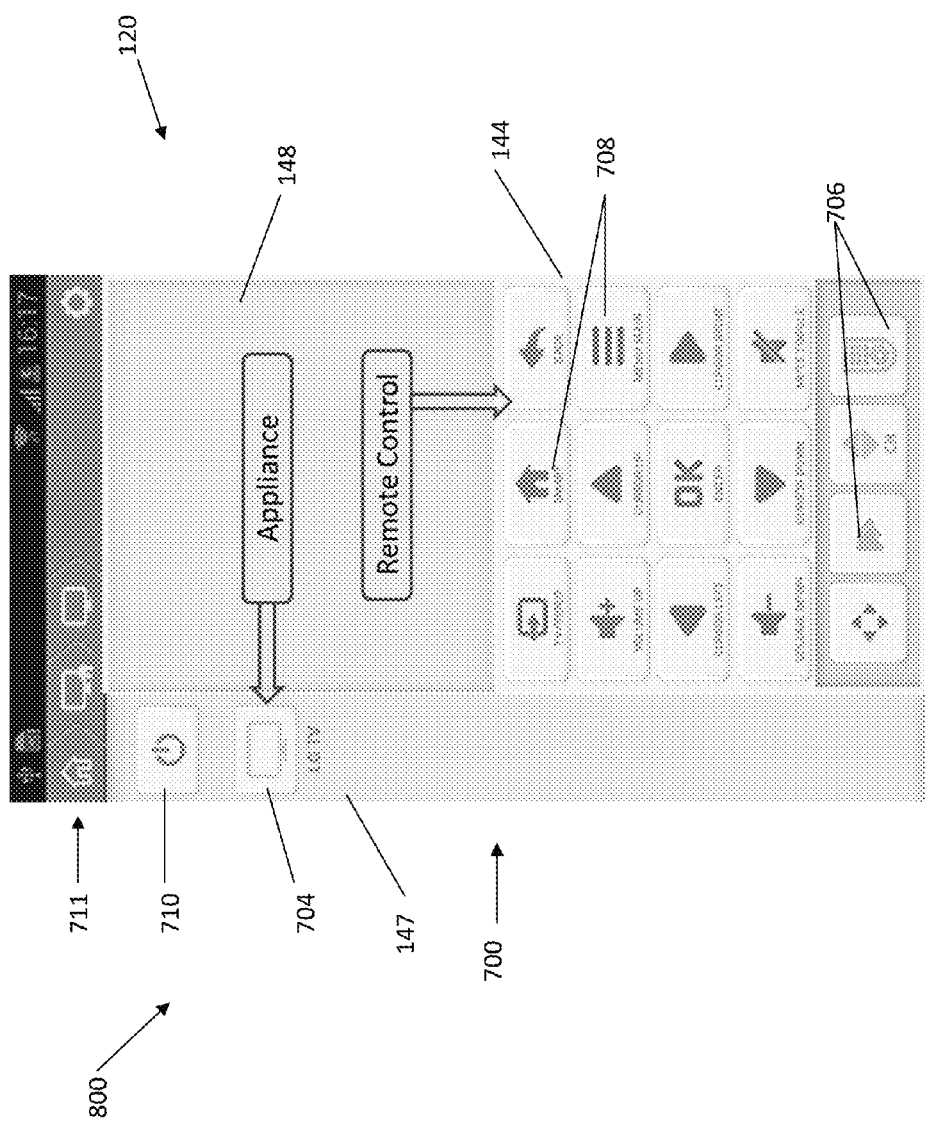
FIG. 8 schematically illustrates an exemplary general remote control screen in the GUI for a remote controller for an appliance, according to an embodiment of the present invention.

Reference is now made to FIG. 8 which schematically illustrates an exemplary general remote control screen 800 in GUI 700 for a remote controller for an appliance, according to an embodiment of the present invention. GUI 700 may be implemented in display 120 which may include display screen 148 which may display data associated with selection of any of the selector buttons 704, 706, 708. As may be appreciated from the figure, appliance selector button 704 may be located on a left side of display 120 which may correspond with appliance selector 147; panel selector buttons 706 may be located on a bottom section of the display, which may correspond with panel selector 146; and element selector buttons 708 may occupy the lower central area of the display which may correspond with control panel 144. Additionally displayed on the top, left side of display 120, which may correspond with the top portion of appliance selector 147, may be ON/OFF selector button 710. On a top section of display 120 may be a ruler 711 which may include several functions, including a return home selector button which may return the user to a home screen, and may correspond with screen 148. Selection of the appliance types or appliance sets may be optionally made at the home screen by means of appliance type selector buttons 702 (not shown in screen 800).

Figure 9:
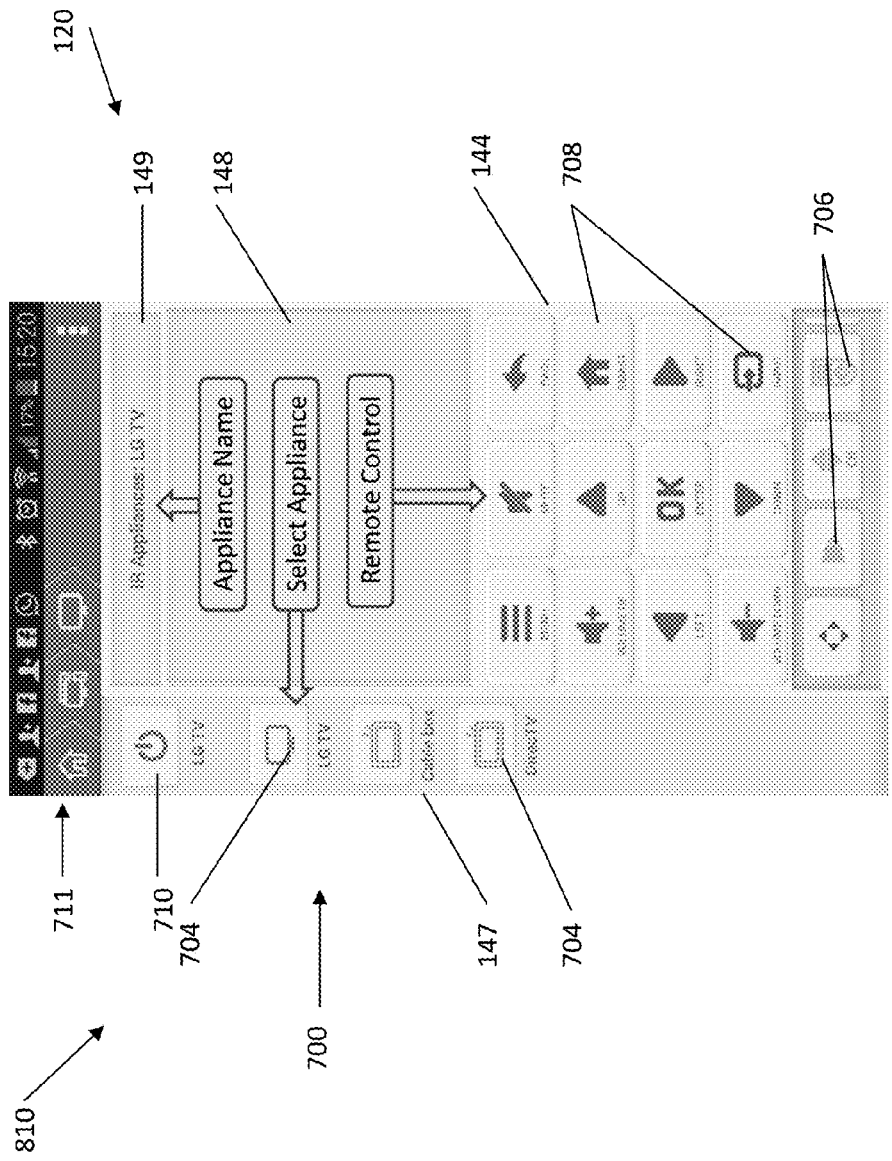
FIG. 9 schematically illustrates an exemplary multiple appliance control screen in the GUI, according to an embodiment of the present invention.

Reference is now made to FIG. 9 which schematically illustrates an exemplary multiple appliance control screen 810 in GUI 700, according to an embodiment of the present invention. Screen 810 may be similar to screen 800 but may include on the left side of display 120, which may correspond with appliance selector 147, several appliance selector buttons 704 for selecting different types of appliances and/or appliance sets and a top screen section 149 in screen 148 wherein may be displayed the name of the selected appliance. For example, appliance selector buttons 704 may include LG TV, Cable Box, and Direct TV, and top screen section 149 may display LG TV if this is the selected appliance.

Figure 10:
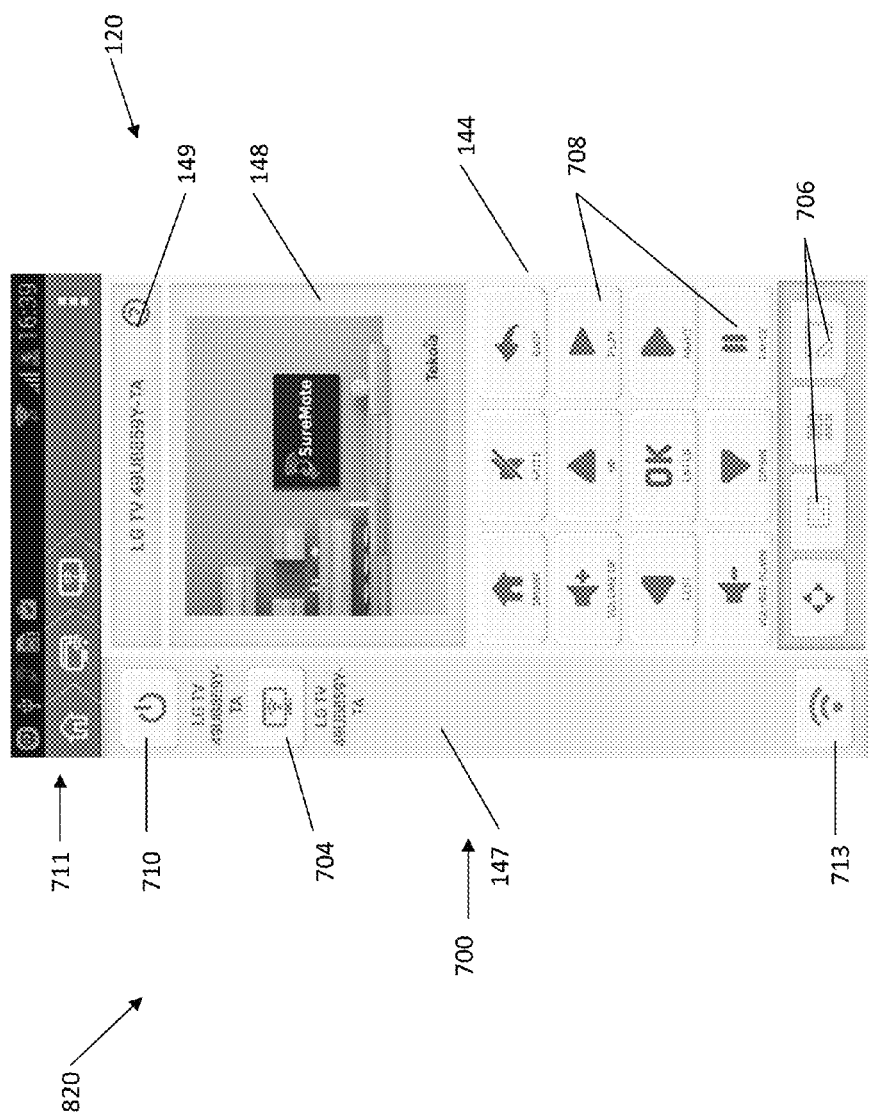
FIG. 10 schematically illustrates an exemplary smart TV remote control screen in the GUI, according to an embodiment of the present invention.

Reference is now made to FIG. 10 which schematically illustrates an exemplary smart TV remote control screen 820 in GUI 700, according to an embodiment of the present invention. Screen 820 may be substantially similar in layout to screen 810 but may be configured to remotely control the smart TV. Screen 820 may additionally include a Wi-Fi selector button 713 to activate Wi-Fi communications, for example as shown on the bottom left corner of display 120, which may correspond with the bottom of appliance selector 147. Top screen section 149 may display the name or other identification associated with the selected appliance (smart TV).

Figure 11:
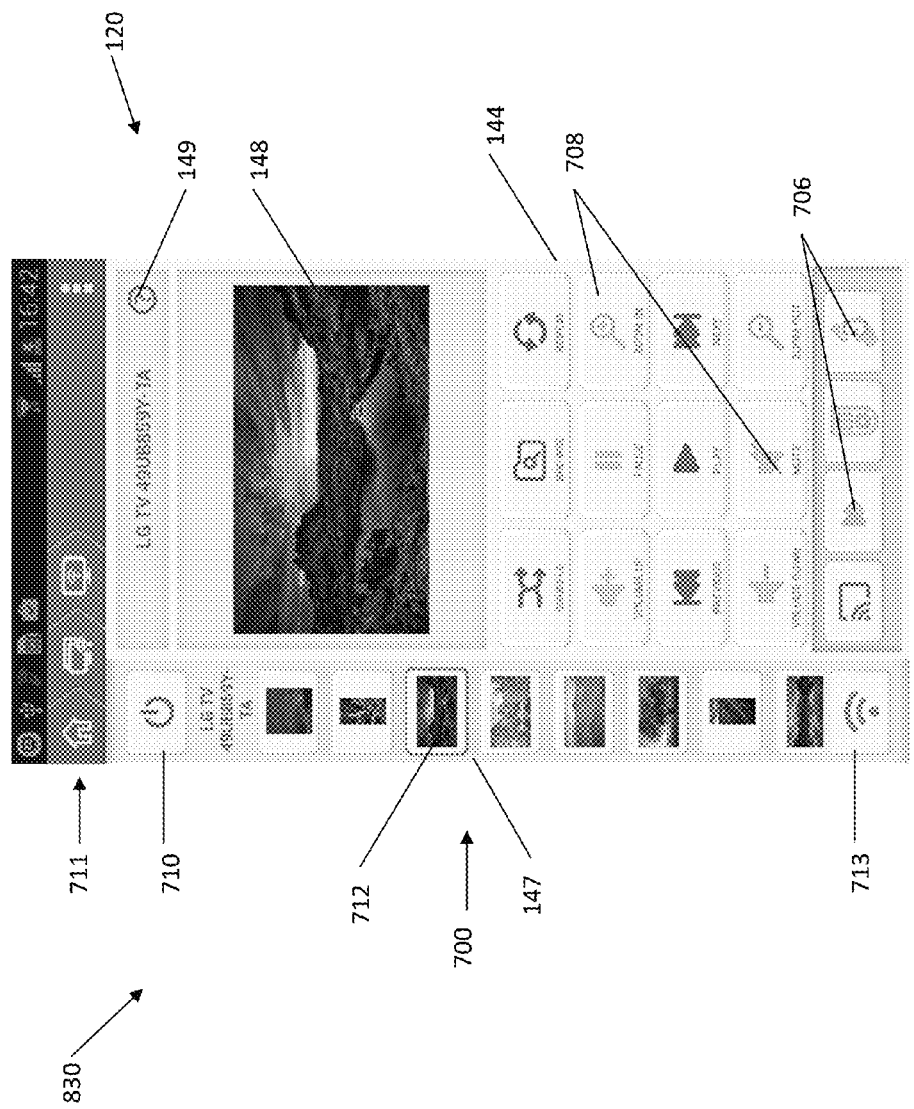
FIG. 11 schematically illustrates an exemplary streaming media control screen in the GUI, according to an embodiment of the present invention.

Reference is now made to FIG. 11 which schematically illustrates an exemplary streaming media control screen 830 in GUI 700, according to an embodiment of the present invention. Screen 830 may be substantially similar in layout to screen 820 but may be configured to remotely control media streaming to the smart TV. Screen 830 may include on the left side of display 120, which may correspond with appliance selector 147, a number of background images 712 which may be selected for display on screen 148 and optionally on the screen of the smart TV.

Figure 12:
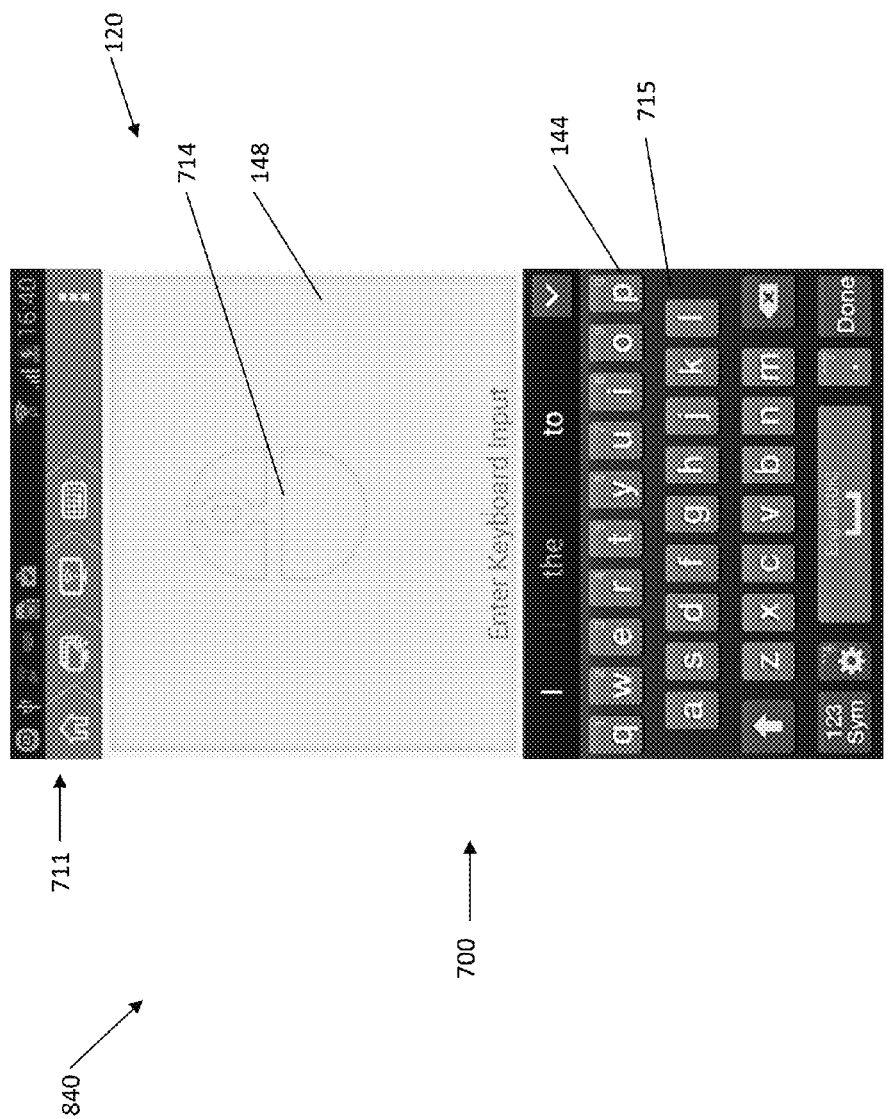
FIG. 12 schematically illustrates an exemplary mouse/keyboard control screen in the GUI, according to an embodiment of the present invention.

Reference is now made to FIG. 12 which schematically illustrates an exemplary mouse/keyboard control screen 840 in GUI 700, according to an embodiment of the present invention. Screen 840 may enable computing device to be used as a mouse, or as a keyboard to type in data, for example in appliances such as smart TVs, gaming appliances, among other controllable appliances. Screen 840 may include an image of a mouse 714 displayed on screen 148 which may indicate use of remote control in "mouse" mode. Screen 840 may additionally include a keyboard 715 which may be located on display 120 in the section corresponding to control panel 144.

Figure 13:
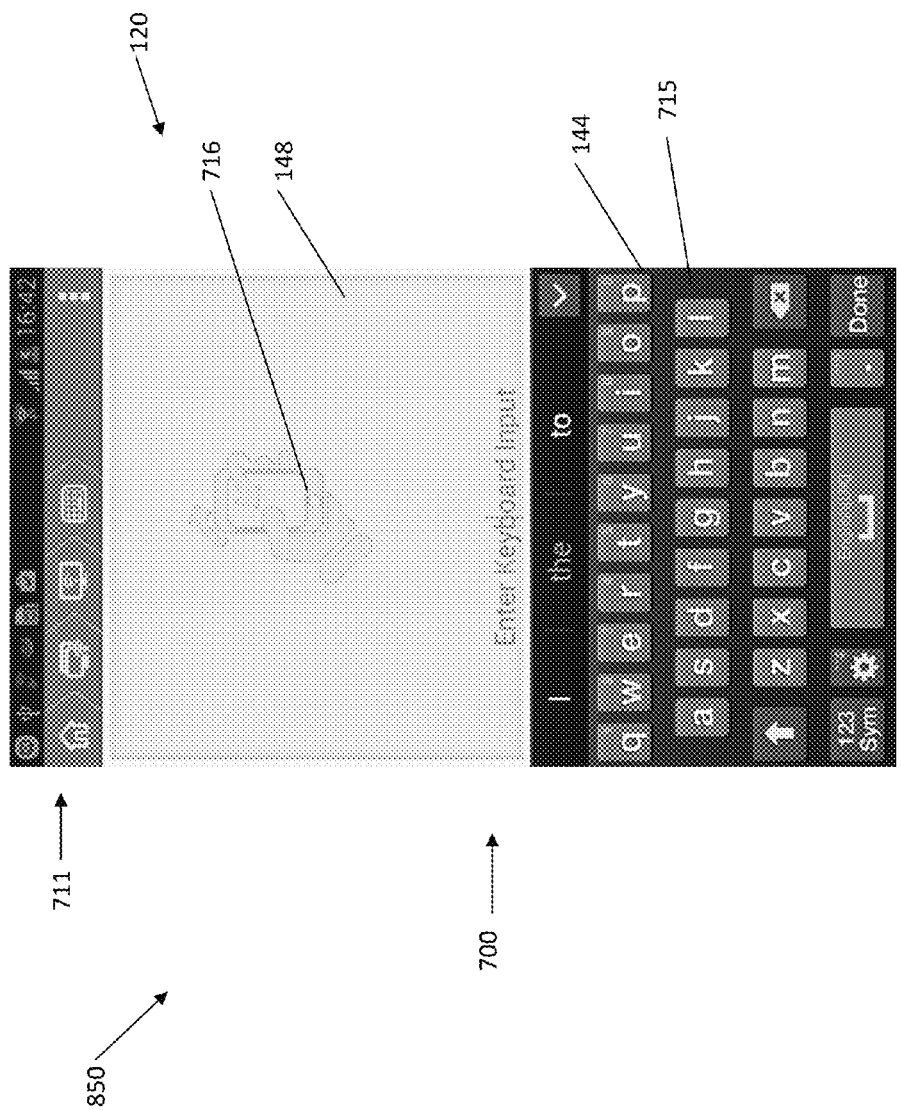
FIG. 13 schematically illustrates an exemplary gyro-gesture/keyboard control screen in the GUI, according to an embodiment of the present invention.

Reference is now made to FIG. 13 which schematically illustrates an exemplary gyro-gesture/keyboard control screen 850 in GUI 700, according to an embodiment of the present invention. Screen 850 may enable computing device 100 to be used as a gesture controller, or as a keyboard to type in data, for example in appliances such as smart TVs, gaming appliances, among other controllable devices which may require use of a gesture controller. Screen 850 may include an image of a "moving hand" displayed on screen 148 which may indicate use of remote control in "gyro/gesture" mode. Screen 850 may additionally include keyboard 715 which may be located on display 120 in the section corresponding to control panel 144.

Figure 14:
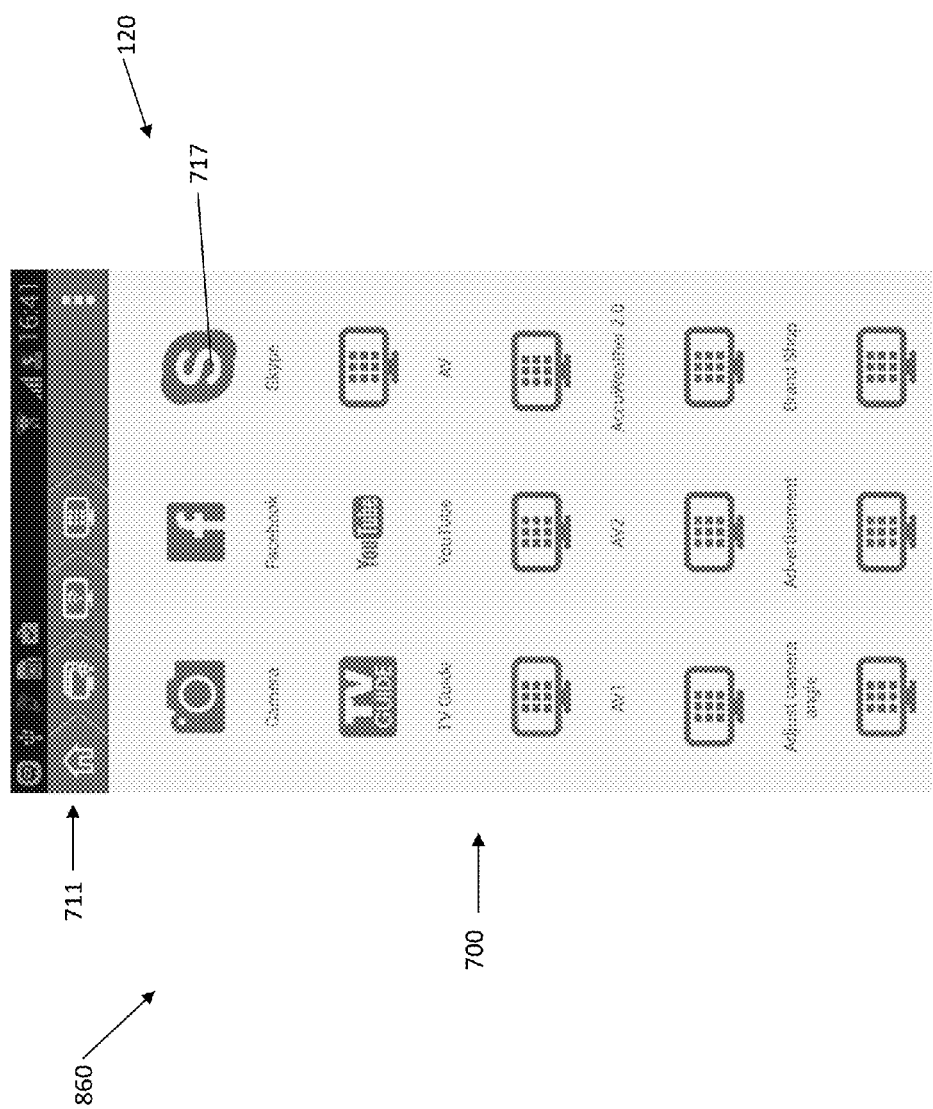
FIG. 14 schematically illustrates an exemplary applications control screen in the GUI, according to an embodiment of the present invention.

Reference is now made to FIG. 14 which schematically illustrates an exemplary applications control screen 860 in GUI 700, according to an embodiment of the present invention. Screen 860 may enable download of applications to appliances such as smart TVs and other suitable controllable appliances. Screen 860 may include applications selector buttons 717 which may be displayed over a major portion of display 120.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A mobile device comprising a processor and a memory holding instructions executed by the processor, the mobile device comprising a display area and a graphics interface unit (GUI) operable to remotely control a plurality of appliances, said GUI comprising:
   a screen area on said display to display output information;
   an appliance selector unit to receive an appliance selection from a user of an appliance to be remotely controlled by said GUI from among said plurality of appliances;
   a panel selector unit to receive a selection from said user of one panel from among a multiplicity of control panels into which control buttons of said selected appliance are organized; and
   a control panel unit having a panel of multiple buttons associated therewith to receive a button selection from said user to control the operation of said selected appliance, said control panel unit to transmit a code associated with said selected button to said selected appliance to instruct said appliance to perform an action,
   said screen to display output information of said selected appliance at least responsive to said transmitted code,
   wherein said control panel unit is located on said display below said screen area, said panel selector unit is located below said control panel section, and said appliance selector unit is located to the side of said control panel.

2. A GUI according to claim 1 wherein said appliance selector unit and said panel selector unit comprise slider bars.

* * * * *